3,177,221
2,1,3-BENZOTHIADIAZOLINE-2,2-DIOXIDES
John Carson, Glenside, Pa., assignor to McNeil Laboratories, Incorporated, a corporation of Pennsylvania
No Drawing. Filed Feb. 5, 1963, Ser. No. 256,236
5 Claims. (Cl. 260—301)

This invention relates to a new series of organic compounds of the general formula

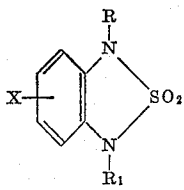

wherein R and $R_1$ are, interchangeably, hydrogen or aralkyl such as benzyl or phenethyl and X is hydrogen or halo, i.e., fluoro, bromo, iodo or, preferably, chloro. The substituents identified by "X" may be in any one of 4-, 5-, 6-, or 7-positions of the benzothiadiazoline nucleus. Because the compounds are acidic, they readily form salts with bases and it is intended that such salts be included within the scope of this invention, e.g., those formed by reaction with alkali metal or alkaline earth metal hydroxides.

The preferred embodiment of this invention embraces the substituted benzothiadiazoline dioxides, advantageously halo - 2,1,3 - benzothiadiazoline-2,2-dioxide and aralkyl-2,1,3-benzothiadiazoline-2,2-dioxide.

The novel compounds are preferably prepared by reacting the unsubstituted or appropriately substituted o-phenylenediamine starting material with sulfamide in the presence of an inert high-boiling organic solvent. The desired product is obtained directly, accompanied by evolution of ammonia. Separation from the solvent is effected by known methods. Organic solvents useful for this reaction include the glycol-diethers such as diethylene glycol diethyl ether, ethylene glycol dibutyl ether, diethylene glycol dibutyl ether and, preferably, diethylene glycol dimethyl ether. Alternatively, one may employ other high-boiling solvents such as ethylene glycol, diphenyl ether or dimethyl formamide.

Substitution of an aralkyl group at the 1,3-positions is preferably accomplished by reacting the appropriate 2,1,3-benzothiadiazoline-2,2-dioxide with an aralkyl halide, advantageously the chloro derivative, e.g., benzyl chloride or phenethyl chloride. This is done in the presence of a base such as an alkali metal hydroxide or alcoholate in a suitable solvent, i.e., sodium hydroxide in water or aqueous ethanol, potassium hydroxide in methanol, sodium ethoxide in ethanol, sodium methoxide in methanol or potassium t-butoxide in t-butanol.

Alternatively, the novel compounds may be prepared by reaction of o-phenylenediamine with sulfuryl chloride in an inert organic solvent; by reaction of o-phenylenediamine with sulfamyl chloride, to give the o-aminobenzenesulfamide, which is cyclized spontaneously to the desired end product; by oxidation of 1,3-diacetyl-benzothiadiazoline with, for example, hydrogen peroxide to give 1,3-diacetyl - 2,1,3 - benzothiadiazoline-2,2-dioxide which, via basic or acidic hydrolysis, gives the desired 1,3-unsubstituted compound; or by reduction of benzothiadiazole to the benzothiadiazoline followed by oxidation to the benzothiadiazoline-2,2-dioxide.

The compounds of this invention cause a decrease in spontaneous motor activity and muscle tone. They are useful as central nervous system depressants, muscle relaxants and tranquilizers.

The following examples are intended to illustrate, but not to limit, the scope of the present invention.

*Example I*

A solution of 10.8 parts by weight of o-phenylenediamine and 9.6 parts by weight of sulfamide in 100 parts by volume of diethylene glycol dimethyl ether ("diglyme") is added dropwise to 200 parts by volume of refluxing "diglyme" over a period of thirty minutes. Ammonia is evolved. About five minutes after the addition is complete, the solution begins to be deeply colored. The mixture is quickly cooled. The solvent is evaporated under reduced pressure. The residue is slurried with hot ether and the ether solution is decanted. The ether solution is washed with dilute hydrochloric acid solution and with saturated brine and is dried over magnesium sulfate. To the ether solution is added 10 parts by volume of benzylamine. A yellow solid precipitates. The solid is collected by filtration. The solid is suspended in 1 N hydrochloric acid and the mixture is extracted with several portions of ether. The ether extracts are combined and dried over magnesium sulfate and the ether is evaporated. A solid remains. It is recrystallized from benzene-ether, yielding 2,1,3 - benzothiadiazoline - 2,2-dioxide, melting point 181° C.–183° C.

*Example II*

A solution of 10.0 parts by weight of 4-chloro-o-phenylenediamine and 6.72 parts by weight of sulfamide in 100 parts by volume of "diglyme" is added dropwise to 200 parts by volume of refluxing "diglyme" over a period of fifteen minutes. When the addition is complete the solution is cooled and the solvent is evaporated under reduced pressure. The residue is slurried with hot ether, and the ether solution is decanted. It is washed with dilute hydrochloric acid and with brine and dried over magnesium sulfate. Addition of 7.5 parts by weight of benzylamine to the ether solution causes precipitation of a yellow, benzylamine salt. The solid (6.3 parts by weight) is filtered and suspended in 1 N hydrochloric acid. The mixture is extracted with several portions of ether. The ether solution is dried over magnesium sulfate and the ether is evaporated under reduced pressure. A solid remains, 5 - chloro - 2,1,3 - benzothiadiazoline-2,2-dioxide, melting point 195° C.–198° C. (dec.). Recrystallization from water gives pure 5-chloro-2,1,3-benzothiadiazoline-2,2-dioxide, melting at 199° C. (dec.).

*Example III*

A solution of 4.0 parts by weight of 2,1,3-benzothiadiazolidine-2,2-dioxide in 56 parts by volume of 0.42 N sodium ethoxide in ethanol is treated with 2.70 parts by volume of benzyl chloride. The mixture is refluxed on a steam bath for four hours, and 56 parts by volume of the sodium ethoxide solution and 2.70 parts by volume of benzyl chloride are added. The mixture is allowed to reflux for two more hours and stand overnight at room temperature. The solid is removed by filtration and the filtrate is evaporated to dryness leaving a red solid. The solid is slurried with methylcyclohexane and filtered. Recrystallization from methylcyclohexane gives material melting at 126° C.–128° C. The combined mother liquors are chromatographed on alumina with chloroform and additional solid, melting point 126° C.–128° C. is obtained, yielding 1,3-dibenzyl-2,1,3-benzothiadiazoline-2,2-dioxide. Further recrystallization from methylcyclohexane raises the melting point to 128° C.–131° C.

What is claimed is:
1. A compound of the formula:

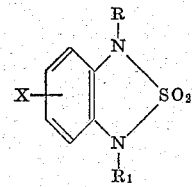

wherein X is a member of the group consisting of hydrogen and halo, and R and $R_1$ are each members of the group consisting of hydrogen, benzyl and phenethyl.
2. 2,1,3-benzothiadiazoline-2,2-dioxide.
3. 5-halo-2,1,3-benzothiadiazoline-2,2-dioxide.
4. 5-chloro-2,1,3-benzothiadiazoline-2,2-dioxide.
5. 1,3-dibenzyl-2,1,3-benzothiadiazoline-2,2-dioxide.

No references cited.

IRVING MARCUS, *Primary Examiner.*
WALTER MODANCE, *Examiner.*